Aug. 30, 1966  R. G. MINER  3,270,264
CONSEQUENT POLE SHADED POLE MOTOR
Filed Feb. 27, 1963  2 Sheets-Sheet 1

INVENTOR.
ROBERT G. MINER
BY
*Holmes & Andersen*
ATTORNEYS

Aug. 30, 1966   R. G. MINER   3,270,264
CONSEQUENT POLE SHADED POLE MOTOR
Filed Feb. 27, 1963   2 Sheets-Sheet 2

INVENTOR.
ROBERT G. MINER
BY
*Holmes & Andersen*
ATTORNEYS

United States Patent Office 3,270,264
Patented August 30, 1966

3,270,264
CONSEQUENT POLE SHADED POLE MOTOR
Robert G. Miner, La Crosse, Wis., assignor to
The Trane Company, La Crosse, Wis.
Filed Feb. 27, 1963, Ser. No. 261,328
1 Claim. (Cl. 318—223)

This invention relates to single phase alternating current shaded pole induction motors and more particularly to motors having means for reconnecting the main windings of the stator to change the number of magnetic poles and provide multiple speed operation.

It is an object of this invention to provide a shaded pole induction motor having short circuited windings so distributed that starting torque is provided for operation with a predetermined number of magnetic poles and for operation with multiples of the predetermined number of magnetic poles.

It is another object of this invention to provide a shaded pole induction motor in which the shaded poles are less in number than the total number of poles.

It is another object of this invention to provide a shaded pole induction motor having means for connecting the main stator windings to effect a predetermined number of magnetic poles and for reconnecting the main stator windings to effect other numbers of magnetic poles which are multiples of the predetermined number of magnetic poles.

It is another object of this invention to provide a shaded pole motor having a plurality of main winding circuits and control means for energizing less than the total number of winding circuits when the windings are connected for less than maximum speed operation.

Other objects and advantages of this invention will become apparent as the specification proceeds to describe the invention with reference to the accompanying drawings in which.

Figure 1:
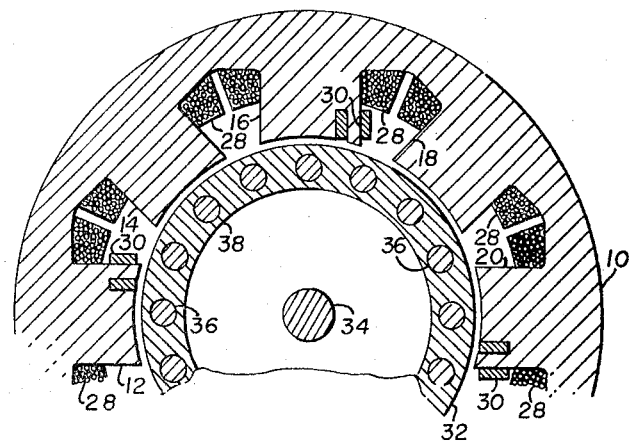
FIGURE 1 is a cross-sectional view of the motor taken on a plane normal to the axis of rotation.
Figure 2:
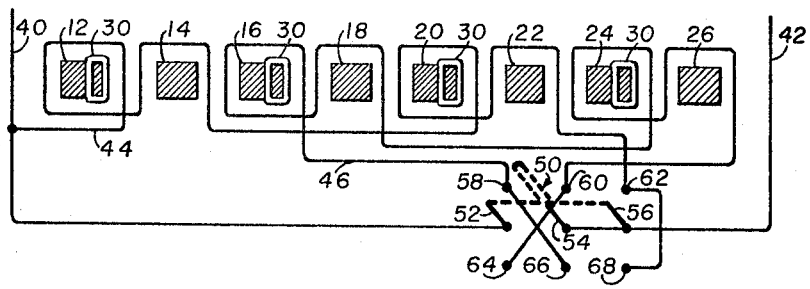
FIGURE 2 is a diagrammatic view of the stator showing the windings and the control.

In FIGURE 1 there is shown a stator 10 formed of a stack of laminations punched from relatively thin sheet magnetic material. As shown in FIGURES 1 and 2 the stator core 10 is of the eight pole variety having stator poles 12, 14, 16, 18, 20, 22, 24, and 26. The stator poles have wound thereon main field exciting windings 28 of conductive material. Alternate poles 12, 16, 20, and 24 have shading coils 30 preferably in the form of a short circuited ring of flat bar stock of conductive material such as copper.

Within the bore of the stator 10 is a rotor 32 mounted on a shaft 34 which is rotatably mounted in bearings (not shown). The rotor 32 is of the conventional squirrel cage type having conductors 36 and short circuiting end rings 38.

Referring to FIGURE 2, the power is supplied through wires 40 and 42. A winding 44 encircles poles 12, 14, 20 and 22. A winding 46 encircles poles 16, 18, 24 and 26. It should be understood that the windings 44 and 46 preferably have a plurality of turns around any stator pole which is encircled.

Figure 3:
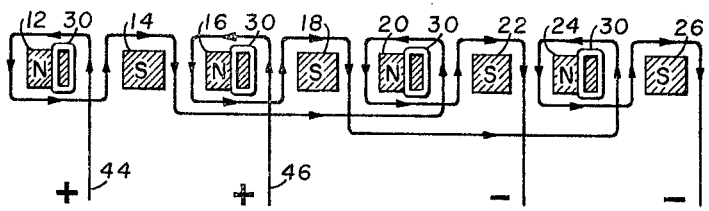
FIGURE 3 is a diagrammatic view of the stator when connected for eight pole operation.

A switch 50 has three blades 52, 54, and 56 which in one position conduct through contacts 58, 60, and 62 respectively to energize the windings as shown in FIGURE 3 in which poles 12, 16, 20, and 24 are north poles as indicated by the letter N and poles 14, 18, 22, and 26 are south poles as indicated by the letter S. In FIGURE 3 there are effectively eight poles and the motor has a synchronous speed of 900 revolutions per minute.

Figure 4:
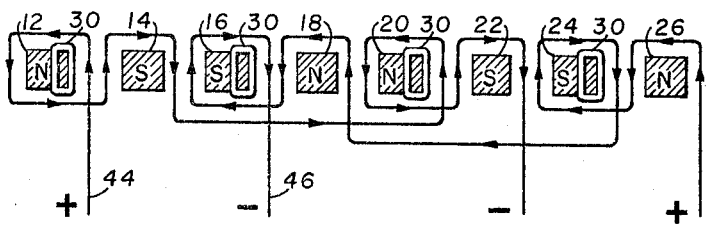
FIGURE 4 is a diagrammatic view of the stator when connected for four pole operation.

The switch 50 can be put in the other position to conduct through contacts 64, 66, and 68 respectively to energize the windings as shown in FIGURE 4 in which the direction of current in winding 46 has been reversed. Therefore stator poles 12 and 26 are effectively one magnetic north pole and stator poles 18 and 20 are effectively a second magnetic north pole. Poles 14 and 16 are effectively one magnetic south pole and poles 22 and 24 are effectively a second magnetic south pole. Therefore the arrangement of FIGURE 4 has effectively four magnetic poles and it has a synchronous speed of 1800 revolutions per minute. Each of the four magnetic poles has a properly located shading coil 30 on the stator pole which comprises the trailing portion of the magnetic pole.

Figure 5:
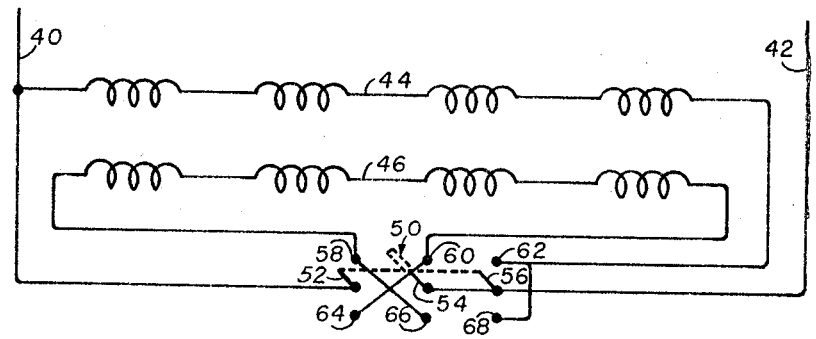
FIGURE 5 is a circuit diagram showing the windings in parallel for operation at both speeds.

FIGURE 5 shows more diagrammatically the arrangement shown in FIGURE 2 in which the windings 44 and 46 are in parallel for operation at both speeds.

Figure 6:
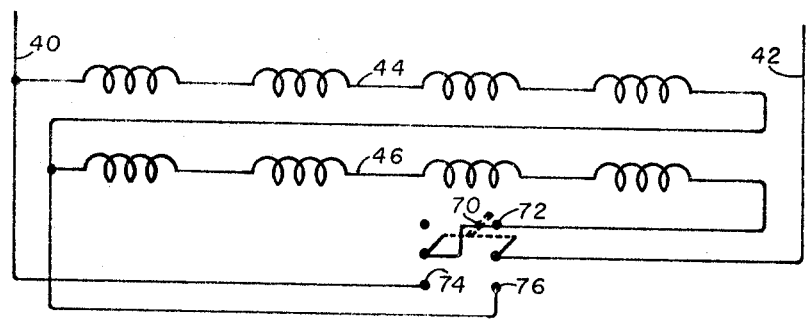
FIGURE 6 is a circuit diagram showing the windings in parallel for operation at high speed and in series for operation at low speed.

In the embodiment of FIGURE 6, a two blade switch 70 conducts through contact 72 for series operation of the windings 44 and 46 at high speed.

Figure 7:
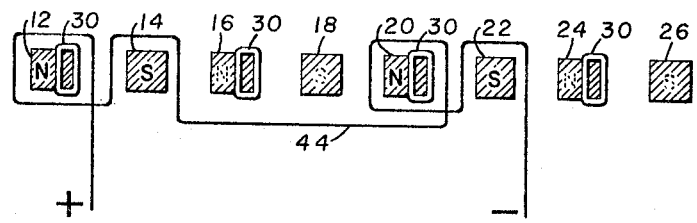
FIGURE 7 is a diagrammatic view of the stator with only one winding circuit energized for low speed operation.

In FIGURE 7 only the winding 44 is energized for low speed operation with eight effective poles. The poles 16, 18, 24, and 26 have a flux induced by the adjacent poles and are therefore designated by dash letters N and S.

Where the torque requirements of the apparatus driven by the motor decrease with a decrease in speed, more efficient low speed operation can be obtained with only one winding energized, because the magnetizing losses of the second winding including the losses in the corresponding shading windings are thus eliminated. The relatively lower magnetizing current attendant with single winding operation also results in an improved power factor.

Figure 8:
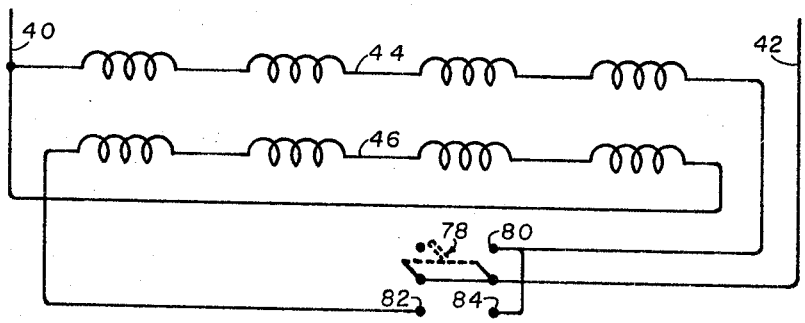
FIGURE 8 is a circuit diagram showing the windings in parallel for high speed operation and with only one winding energized for low speed operation.

In FIGURE 8 a two blade switch 78 conducts through contact 80 to energize only winding 44 for low speed operation as shown in FIGURE 7. Switch 78 conducts through contacts 82 and 84 to energize windings 44 and 46 in parallel for effectively four pole high speed operation.

Although magnetic polarities are shown as north and south and the current flow as from plus to minus, it should be understood that since this is an alternating current motor, these are instantaneous values, and are used to show the relative polarities with various operating conditions.

Although the invention has been shown by way of example as applied to two speed operation with eight poles and four poles, it should be understood that it is applicable to other combinations as for instance to a motor having twelve and six pole operation in which a maximum of six shading coils would be used. It is thus seen that the number of shading poles corresponds to the number of poles at high speed operation.

Although I have described in detail preferred embodiments of my invention, I contemplate that various changes may be made without departing from the scope or spirit of my invention and I desire to be limited only by the claim.

I claim:

A single phase alternating current shaded pole motor comprising a plurality of stator poles, a first winding on some of said stator poles, a second winding on the other of said stator poles, means for energizing only said first winding to effect a first number of magnetic poles, means for energizing said first windings and said second windings to reverse the polarity of some of said stator poles and to effect a lesser number of magnetic poles for operation at a second speed, and shading poles on only the stator poles which comprise the trailing portions of said magnetic poles during operation at said lesser number of magnetic poles.

References Cited by the Examiner

UNITED STATES PATENTS

| | | | |
|---|---|---|---|
| 796,368 | 8/1905 | Steinmetz | 310—172 X |
| 1,875,207 | 8/1932 | Apple | 318—223 |
| 2,267,805 | 12/1941 | Appleman | 318—224 |
| 2,454,136 | 11/1948 | Carville | 318—224 |
| 2,570,894 | 10/1951 | Willsey | 318—223 |
| 2,864,987 | 12/1958 | Vaske | 318—224 |
| 2,946,941 | 7/1960 | Jin | 318—224 X |
| 3,114,093 | 12/1963 | Fricke | 318—224 |

FOREIGN PATENTS 760,975  11/1956  Great Britain.

ORIS L. RADER, *Primary Examiner.*

G. A. FRIEDBERG, C. E. ROHRER,
*Assistant Examiners.*